Nov. 7, 1950      E. HRABAL      2,528,658
CULINARY FORK
Filed May 10, 1948
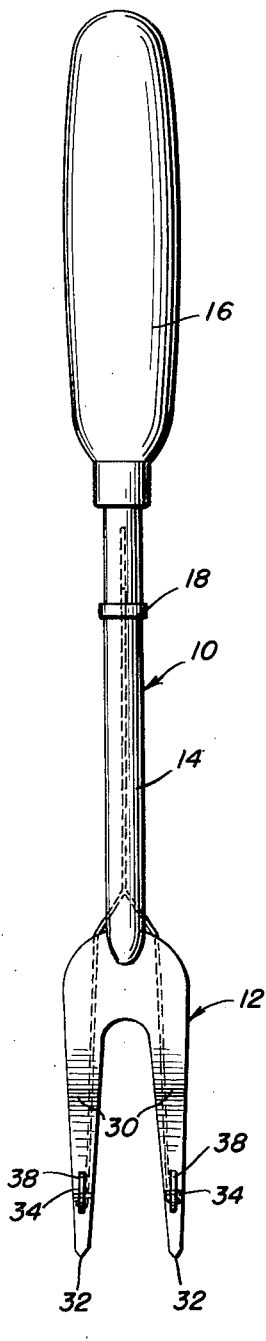
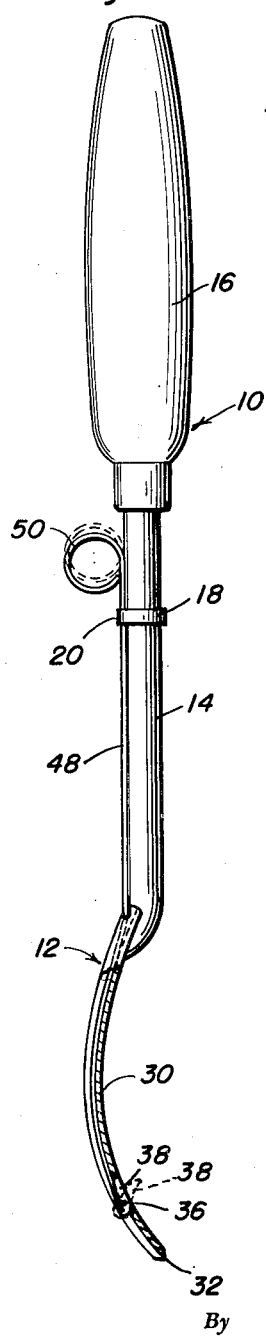
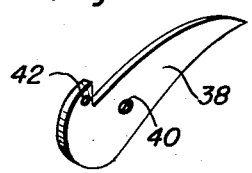
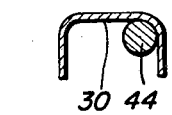
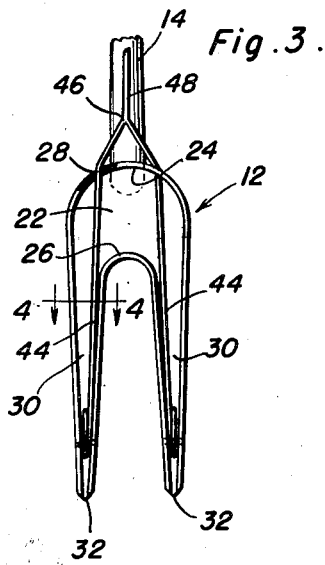
Inventor
Eduard Hrabal
By *Clarence A. O'Brien and Harvey B. Jacobson*
Attorneys Patented Nov. 7, 1950

2,528,658

UNITED STATES PATENT OFFICE 2,528,658

CULINARY FORK

Eduard Hrabal, Washington, D. C., assignor of thirty-five per cent to Rafael Dominguez, Washington, D. C.

Application May 10, 1948, Serial No. 26,059

1 Claim. (Cl. 30—137)

This invention relates to a culinary fork such as a carving fork and has for its primary object to prevent the slipping of foodstuffs from the tines of the fork.

Another object is to facilitate the release of the foodstuffs when it is desired to deposit them on a platter or the like.

The above and other objects may be attained by employing this invention which embodies among its features a fork head having transversely channel shaped pointed tines each tine having an elongated longitudinally extending slot extending therethrough, a spur pivotally supported in each slot, and means lying in the channels of the tines for moving the spurs about their pivots into and out of a position wholly within the perimeter of their respective tines.

Other features include manually actuated means adjacent the grip on the handle of the fork for controlling the movements of the spurs.

In the drawings:

Figure 1 is a side view of a fork embodying the features of this invention,

Figure 2 is an edge view of the fork illustrated in Figure 1,

Figure 3 is a fragmentary rear view of the fork,

Figure 4 is a transverse sectional view taken substantially along the line 4—4 of Figure 3 and Figure 5 is a perspective view of one of the spurs.

Referring to the drawings in detail, a fork designated generally 10 comprises a fork head designated generally 12 to which is attached a handle 14 carrying at the end remote from the head a hand grip 16. The handle 14 is provided near the hand grip 16 with a suitable band 18 which is provided on the back side of the fork with a loop 20 forming a guide for the spur actuating means to be more fully hereinafter described.

The head 12 previously referred to comprises a main body portion 22 provided at its edges with flanges 24 and 26, and the flange 24 is provided on opposite sides of the longitudinal axis of the handle 14 with openings 28. Projecting from the body 22 of the head 12 in opposed relation to the handle 14 are channel shaped tines 30 which taper from their junctions with the head or body 22 and terminate in pointed ends 32. Formed in the tines 30 adjacent the pointed ends 32 are elongated longitudinal slots 34, and pivotally mounted between the side flanges of the tines as at 36 are spurs 38, the ends of which are adapted to be projected outwardly as suggested by the dotted line in Figure 2 in order to prevent foodstuffs from slipping from the ends of the tines. As illustrated in Figure 5 in addition to the pivot openings 40, the spurs 38 are provided with eccentrically located openings 42 in which the spur actuated flexible members are anchored.

Extending through the openings 28 in the flange 24 of the body 22, and lying in the channel shaped tines 30 are flexible members 44, one end of each of which is anchored in an eccentric opening 42 in the spur in its respective tine while the ends of the flexible members 44 remote from those which are anchored in the spurs 38 are brought together and coupled as at 46 to a flexible member 48. The end of the flexible member 48 remote from that which is connected to the flexible members 44 extends through the loop 20 to a point near the hand grip 16. Carried by the end of the flexible member 48 adjacent the hand grip 16 is a finger loop 50 by means of which the flexible member 48 may be manipulated to cause the flexible members 44 to move forward or backward along their respective tines 30 to cause their respective spurs 38 to be projected or retracted as will be readily understood upon reference to Figure 2.

Obviously the tines 30 may be curved longitudinally as suggested in Figure 2, though in some instances they may be straight, according to the type of fork to be used.

In operation it will be understood that the fork is used in the ordinary manner with the spurs 38 lying wholly within the perimeters of the respective tines. When it is desired to prevent foodstuffs being handled by the fork from slipping off the ends of the tines, pull may be exerted on the finger loop 50 to cause the flexible member 48 to move longitudinally toward the hand grip 16, thereby exerting pull on the flexible members 44 and moving the spurs outwardly as suggested by the dotted lines in Figure 2. Obviously upon moving the finger loop 50 in the opposite direction the pressure transmitted by the flexible member 48 to the flexible members 44 will cause the spurs 38 to swing about their pivot 36 into the full line position illustrated in Figures 1 and 2. In its preferred form the flexible members 44 and 48 are preferably formed from a relatively stiff wire so that either pull or pressure may be applied to the spurs 38 from the vicinity of the hand grip 16.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A culinary fork comprising a handle, a fork head carried by one end of said handle, transversely channel shaped pointed tines projecting from the fork head opposite the handle, each tine having an elongated longitudinally extending slot adjacent its pointed end, a spur pivotally supported in each slot, a flexible member coupled to a spur and extending longitudinally through its respective channel shaped tine for moving its respective spur about its pivot, a guide loop on the handle, a flexible member coupled to the first mentioned flexible members and slidable through the guide loop for simultaneously moving the spurs about their pivots.

EDUARD HRABAL.

REFERENCES CITED

The following references are of record in the file of this patent:

UNITED STATES PATENTS

| Number | Name | Date |
|---|---|---|
| 858,429 | Webb | July 2, 1907 |
| 950,835 | Bonin et al. | Mar. 1, 1910 |
| 2,092,918 | Imler | Sept. 14, 1937 |
| 2,194,016 | Geller | Mar. 19, 1940 |